United States Patent
Ahn et al.

(10) Patent No.: US 8,378,617 B2
(45) Date of Patent: Feb. 19, 2013

(54) METHOD OF CONTROLLING CURRENT OF HIGH-SPEED SWITCHED RELUCTANCE MOTOR

(75) Inventors: Jin-Woo Ahn, Busan (KR); Dong-Hee Lee, Busan (KR)

(73) Assignee: Kyungsung University Office of Industry-Academy Cooperation, Busan (KR)

( * ) Notice: Subject to any disclaimer, the term of this patent is extended or adjusted under 35 U.S.C. 154(b) by 141 days.

(21) Appl. No.: 13/024,148

(22) Filed: Feb. 9, 2011

(65) Prior Publication Data
US 2012/0104987 A1   May 3, 2012

(30) Foreign Application Priority Data
Nov. 3, 2010  (KR) .................. 10-2010-0108738

(51) Int. Cl.
*H02P 1/46*   (2006.01)
(52) U.S. Cl. ..... 318/701; 318/94; 318/700; 318/400.13; 318/254.1; 318/720; 180/65.225; 180/65.29; 363/65; 363/16; 363/132; 363/35; 363/271
(58) Field of Classification Search ............ 318/701, 318/94, 700, 400.13, 254.1, 254.2, 720, 724; 180/65.225, 65.29; 363/65, 16, 132, 35, 363/271, 37, 89, 98, 125
See application file for complete search history.

(56) References Cited

U.S. PATENT DOCUMENTS

| 3,976,927 | A | * | 8/1976 | Puschel et al. | 318/368 |
| 5,850,133 | A | * | 12/1998 | Heglund | 318/700 |
| 7,443,125 | B2 | * | 10/2008 | Clothier et al. | 318/701 |
| 2009/0201620 | A1 | * | 8/2009 | Gray et al. | 361/159 |
| 2010/0213915 | A1 | * | 8/2010 | Kora et al. | 323/290 |
| 2010/0264858 | A1 | * | 10/2010 | Liang et al. | 318/254.2 |

* cited by examiner

*Primary Examiner* — Walter Benson
*Assistant Examiner* — Jorge Carrasquillo
(74) *Attorney, Agent, or Firm* — Birch, Stewart, Kolasch & Birch, LLP

(57) ABSTRACT

Disclosed herein is a method of controlling the current of a high-speed Switched Reluctance Motor (SRM) using an inverter circuit including a first switching element, a second switching element, a first diode, a second diode and a reactor, wherein the first switching element and the first diode, the second diode and the second switching element are connected to a bridge circuit, and one end of the reactor is connected to the junction of the first switching element and the first diode, and the remaining end of the reactor is connected to the junction of the second diode and the second switching element; and excitation mode, free-wheeling mode-1, the excitation mode, and free-wheeling mode-2 are sequentially performed in a unit period T, and, when the control is terminated, demagnetization is performed.

3 Claims, 6 Drawing Sheets

METHOD OF CONTROLLING CURRENT OF HIGH-SPEED SWITCHED RELUCTANCE MOTOR

BACKGROUND OF THE INVENTION

1. Field of the Invention

The present invention relates generally to a method of controlling the current of a Switched Reluctance Motor (SRM), and, more particularly, to a method of controlling the current of an SRM using an inverter circuit including a first switching element, a second switching element, a first diode, a second diode and a reactor, which is configured such that the first switching element and the first diode, the second diode and the second switching element are connected to a bridge circuit, and one end of the reactor is connected to the junction of the first switching element and the first diode, and a remaining end of the reactor is connected to the junction of the second diode and the second switching element; and excitation mode in which the first switching element is turned on the second switching element is turned on, free-wheeling mode-1 in which the first switching element is turned off and the second switching element is turned on, the excitation mode, and free-wheeling mode-2 in which the first switching element is turned on and the second switching element is turned off are sequentially performed in a unit period T, and, when the control is terminated, demagnetization in which the first switching element and the second switching element are turned off is performed, hereby being able to reduce current ripple caused by the fast dynamic characteristics of the high-speed SRM and overcome overshoot current caused by the time delay of current sensing.

2. Description of the Related Art

In general, a switched reluctance motor is a kind of reluctance motor, and includes a multi-phase stator formed by winding an armature coil and configured to generate magnetic force, a rotor adapted to be rotated by magnetic force generated by a stator and magnetic force generated based on the relative positions of teeth, and a location detection unit configured to include a location sensing unit and a sensor plate and to sense the location of the rotor by detecting location detection pulses at predetermined angular resolution as the location of the rotor varies. In this switched reluctance motor, a plurality of teeth is symmetrically formed in the rotor, the armature coil is symmetrically wound around the multi-phase stator, and the location sensing unit senses the locations of the rotor and outputs location sensing pulses, thus sequentially driving the multi-phase armature coil in synchronization with the location sensing pulses.

In the switched reluctance motor, power applied to the armature coil wound around the multi-phase stator is selectively supplied and cut off using a switching element. A forward rotating torque corresponding to an input pulse signal may be generated in the rotor based on magnetic inhaling force by applying an input pulse signal to the control terminal of the switching element in synchronization with the location sensing pulse of the location sensing unit and, thereby, sequentially varying the excitation state between the rotor and the stator. When a specific excitation state is not varied, the rotor may be stopped in a specific location. A reverse rotating force may be generated by controlling the phase of an input pulse signal applied to the switching element on the basis of the maximum inductance shape. Accordingly, a variety of types of drive control can be achieved, so that the motor is being usefully used in various application fields.

In particular, a high-speed switched reluctance motor (SRM) has compact size and high system efficiency, so that it frequently applied to and used for high RPM systems, such as a blower, a compressor, and a pump. A common SRM control method is configured to control an SRM by controlling driving current in accordance with driving speed. In order to control driving current, Pulse Width Modulation (PWM) is used. As is well known, PWM is a method which is configured to perform modulation by changing the widths of pulses in response to the magnitude of modulation signals, and is widely used to control the current of an electric motor which is subjected to variable and constant speed driving.

In the meantime, the high-speed driving of an electric motor is subjected to a variety of types of limiting factors, such as iron loss, loss in winding, the length of the iron core of a stator, dynamics in a shaft, bearings, the VA (Voltage-Amps) rating of a controller. Accordingly, the design and control of the current of an SRM suitable for high-speed driving require many considerations. Furthermore, in a high-speed driving system, due to electrical frequency and core loss from a high frequency, the number of poles is a very important factor. In order to reduce an electrical frequency at the same speed, many high-speed drives adopt a two-pole system.

Meanwhile, the high-speed SRM is problematic in that the impedance of the motor is significantly smaller than that of a general motor so as to deal with fast electrical dynamic characteristics, with the result that current ripple increase in a high-speed operation condition compared to the conventional motor system. In order to reduce current ripple, high-frequency switching is appropriate. The switching frequency is normally limited by switching loss and the electrical characteristics of a power device.

Meanwhile, a high resolution encoder is not suitable for a high-speed motor due to its mechanical, electrical limitations. The sensing of the rotor location of a low resolution encoder is problematic in that it is not suitable to control phase current without incurring an overshoot phenomenon during the excitation interval of the switched reluctance motor due to the time delay of hardware and the feedback signal of phase current.

Accordingly, due to the fast rotation characteristics of the high-speed SRM, the delay time of current sensing may be a great problem and overshoot current resulting from the delay time is considered to be a serious problem.

A plurality of conventional technologies related to a method of controlling the current of an SRM has been proposed. An example of these technologies is Korean Patent No. 294,209. This conventional technology discloses an apparatus for controlling the current of a switched reluctance motor, the switched reluctance motor including an inverter unit for variably switching an excitation state with respect to each phase of a multi-phase stator, in which, when a current sensing unit is electrically connected to the inverter unit and senses current actually applied to an armature coil, a current control signal is generated to compensate for the current error between the current reference of a current reference unit and the actually applied current using a current control unit, and the current signal is received, subjected to pulse width modulation and then provided to the inverter unit, thereby being able to effectively improve the operating characteristics of the switched reluctance motor by minimizing current error.

This conventional technology is advantageous in that it enables optimal current control on the basis of the location of a rotor relative to that of a stator, so that the rotating torque of the motor can be maximized and noise generated by torque ripple during rotation can be reduced, thereby improving the overall efficiency of the switched reluctance motor. However, it is disadvantageous in that there is an actual limitation to its application to high-speed operation mode in light of the characteristics of the high-speed SRM, and, even if it is applied to high-speed operation mode, it is still difficult to reduce the current ripple of the high-speed SRM and overcome overshoot current using this control method.

Another conventional technology, that is, Korean Patent Application No. 228,695, discloses a method of controlling the driving time of a switched reluctance motor, which is configured to receive a location signal related to the sensed location of a rotor and to allow the motor to operate within delay time limits while maintaining a turn-on duration for a specific time on the basis of a Look-Up Table (LUT) in which preset speed-based turn-on delay time data is recorded for respective rotating speeds, thus being able to effectively reduce torque ripple by optimizing the turn-on and turn-off time of an armature coil.

However, this technology is still disadvantageous in that it is not suitable for high-speed operation mode, in that accuracy is low because a look-up table for delay time data, which can be inaccurately recorded due to various situations, is used, and in that it cannot reduce the current ripple of the high-speed SRM.

SUMMARY OF THE INVENTION

Accordingly, the present invention has been made keeping in mind the above problems occurring in the prior art, and an object of the present invention is to provide a method of controlling the current of a high-speed SRM according to the present invention, which is capable of reducing the current ripple of the high-speed SRM and overcoming overshoot current caused by the time delay of current sensing, thus enabling accurate and efficient current control to be performed in high-speed operation mode.

In order to accomplish the above object, the present invention provides a method of controlling the current of a high-speed SRM using an inverter circuit including a first switching element, a second switching element, a first diode, a second diode and a reactor, wherein the first switching element and the first diode, the second diode and the second switching element are connected to a bridge circuit, one end of the reactor is connected to the junction of the first switching element and the first diode, and a remaining end of the reactor is connected to the junction of the second diode and the second switching element, and wherein excitation mode in which the first switching element is turned on the second switching element is turned on, free-wheeling mode-1 in which the first switching element is turned off and the second switching element is turned on, the excitation mode, and free-wheeling mode-2 in which the first switching element is turned on and the second switching element is turned off are sequentially performed in a unit period T, and, when the control is terminated, demagnetization in which the first switching element and the second switching element are turned off is performed.

In the excitation mode, the current of the high-speed SRM may be sequentially controlled in maximum voltage mode, in counter electromotive voltage mode, and in PI control mode.

In the maximum voltage mode, maximum voltage $V_{max}$ may be applied in an interval from a point at which the switch is turned on to a point of rising interval time delay $t_r$, in the counter electromotive voltage mode, counter electromotive voltage $V_{emf}$ may be applied in an interval from a point at which the maximum voltage mode is terminated to a point at which a phase current value and a feedback current value become equal, and in the PI control mode, PI control voltage $V_{PI}$ may be applied in an interval from a point at which the counter electromotive voltage mode is terminated and a point at which the switch is turned off, where $V_{max} = V_{dc}$, $$V_{emf} = i_m \frac{dL(\theta, i)}{d\theta} \omega_{rm} \text{ and } V_{PI} = K_p \Delta i_m + K_i \int \Delta i_m dt + V_{emf}.$$

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
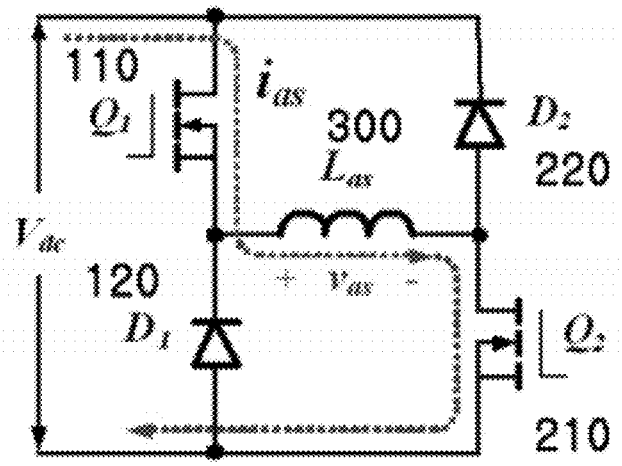
FIGS. 1A to 1D are circuit diagrams of the excitation mode, free-wheeling mode-1, free-wheeling mode-2 and demagnetization mode of a method of controlling the current of a high-speed SRM according to an embodiment of the present invention.

Reference now should be made to the drawings, in which the same reference numerals are used throughout the different drawings to designate the same or similar components.

The present invention will be described in detail below with reference to the accompanying drawings. If in the following description of the present invention, detailed descriptions of well-known functions or configurations may unnecessarily make the gist of the present invention obscure, the detailed descriptions will be omitted.

The following terms are terms which are defined based on functionality in the present invention. Since the meanings of these terms may vary depending on a user or operator's intension or a custom, the definitions of these terms should be determined based on the entire content of the present specification that describes the present invention.

Figure 2:
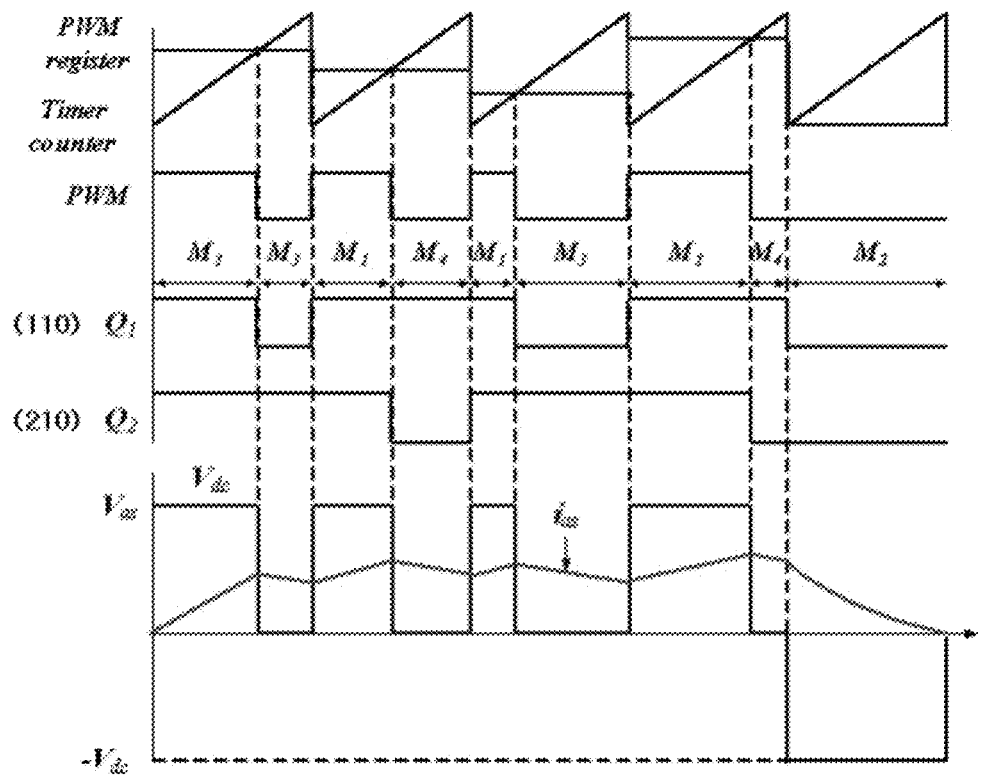
FIG. 2 is a graph of the PWM signal, switching signal, and output signal of the method of controlling the current of a high-speed SRM according to the embodiment of the present invention.
Figure 3:
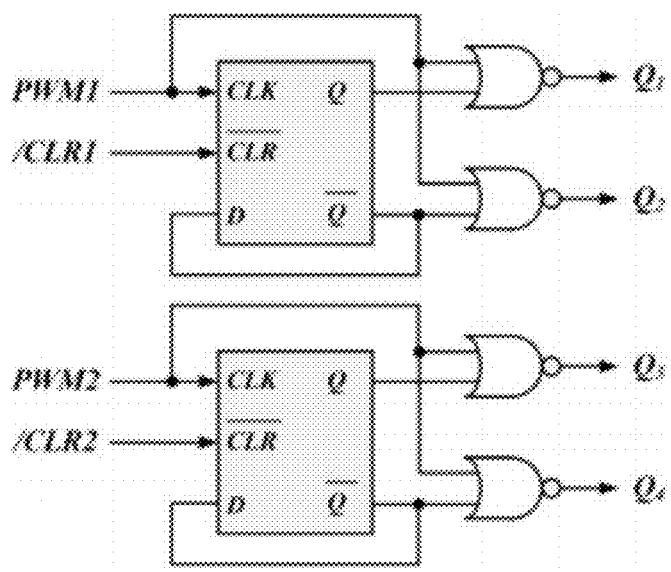
FIG. 3 is a logic circuit diagram in which the method of controlling the current of a high-speed SRM according to the embodiment of the present invention is implemented.
Figure 4:
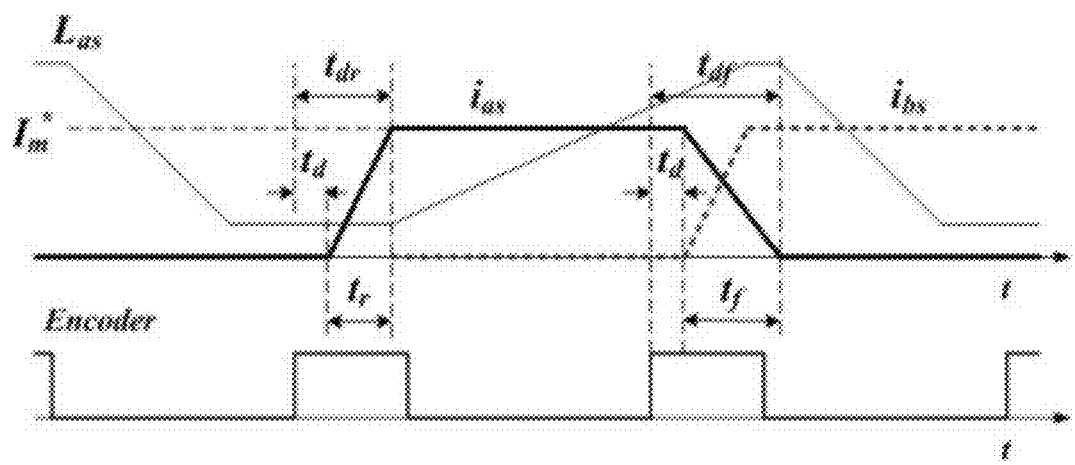
FIG. 4 is a graph of an encoder signal having general phase current and low dynamic characteristics.
Figure 5:
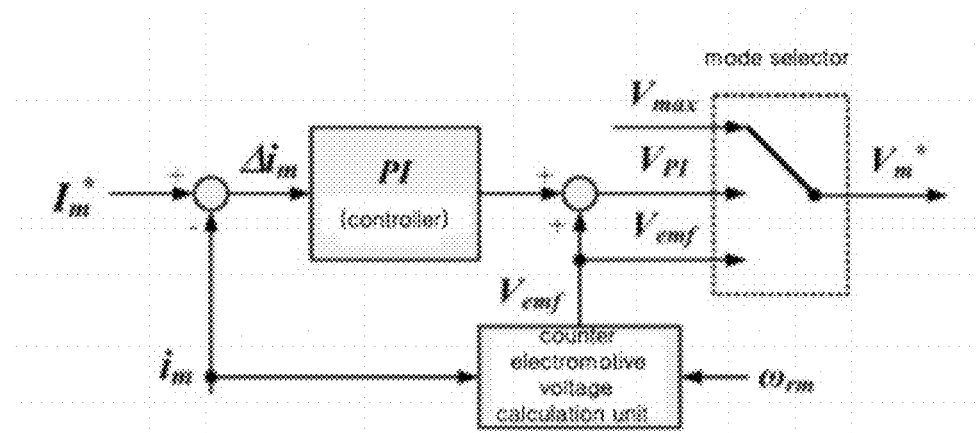
FIG. 5 is a schematic block diagram related to the control of the current of a high-speed SRM according to another embodiment of the present invention.
Figure 6:
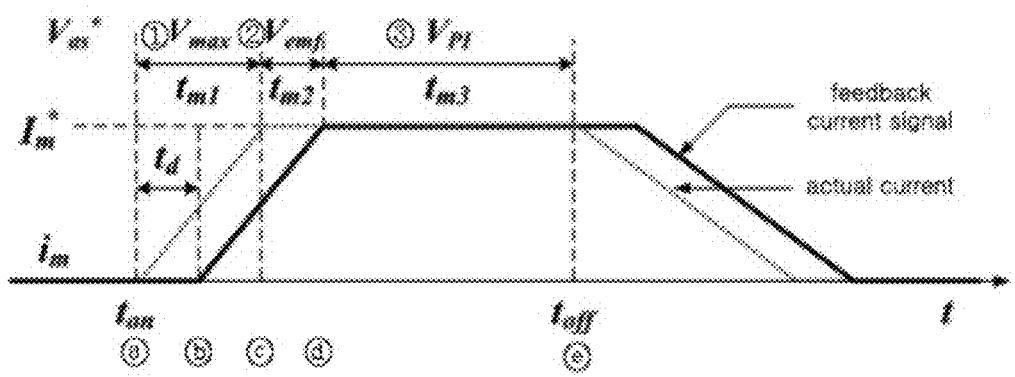
FIG. 6 is a current, voltage and time graph illustrating a method of controlling the current of a high-speed SRM according to another embodiment of the present invention.
Figure 7A:
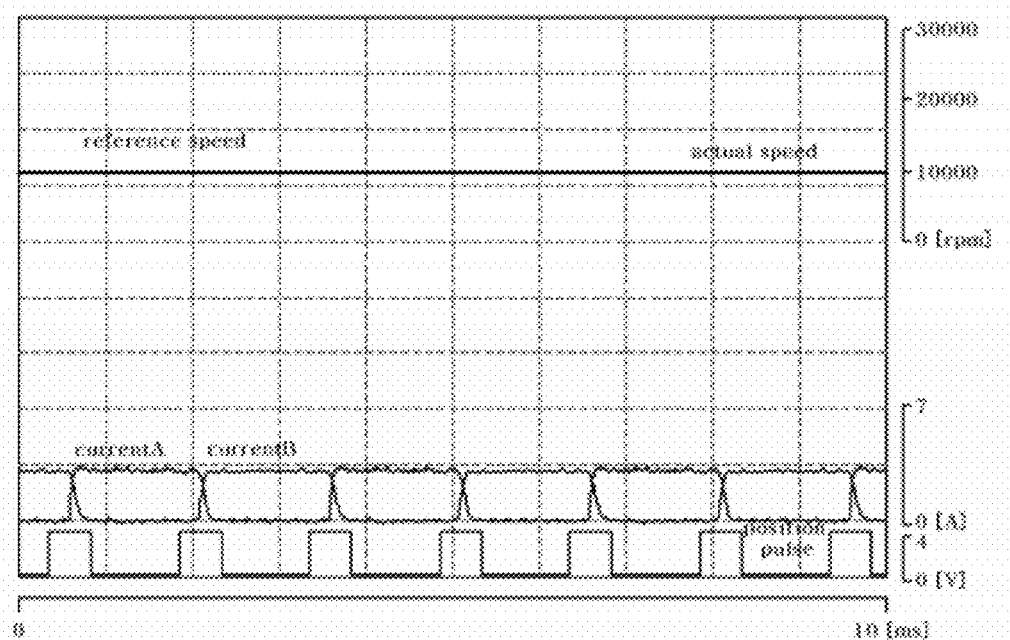
FIGS. 7A and 7B are current response characteristic graphs which are obtained when current control is performed according to the present invention.
Figure 7B:
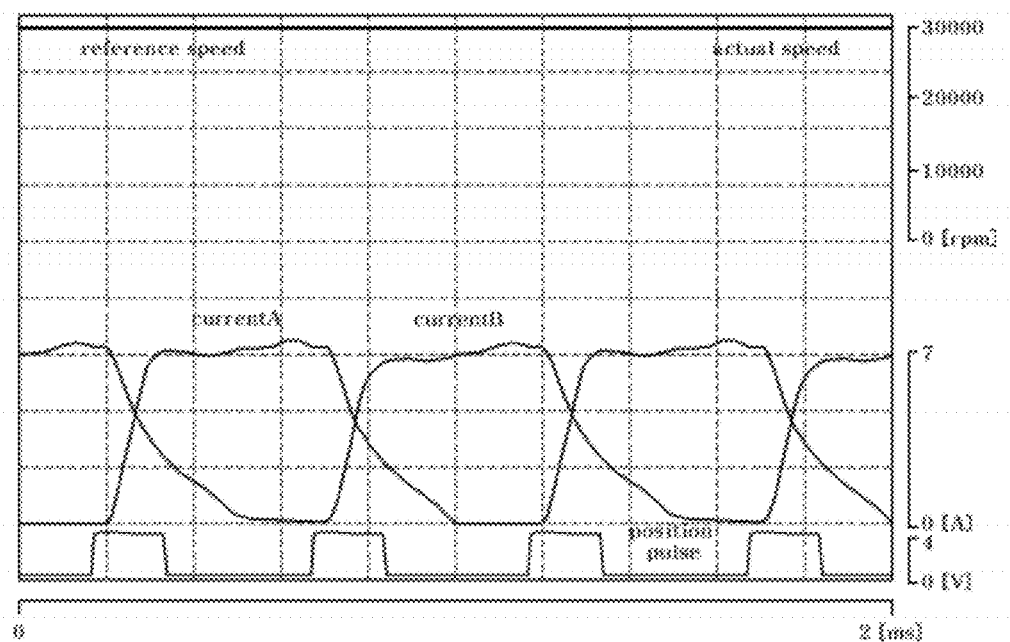

FIGS. 1A to 1D are circuit diagrams of the excitation mode, free-wheeling mode-1, free-wheeling mode-2 and demagnetization mode of a method of controlling the current of a high-speed SRM according to an embodiment of the present invention. FIG. 2 is a graph of the PWM signal, switching signal, and output signal of the method of controlling the current of a high-speed SRM according to the embodiment of the present invention. FIG. 3 is a logic circuit diagram in which the method of controlling the current of a high-speed SRM according to the embodiment of the present invention is implemented. FIG. 4 is a graph of an encoder signal having general phase current and low dynamic characteristics. FIG. 5 is a schematic block diagram related to the control of the current of a high-speed SRM according to another embodiment of the present invention. FIG. 6 is a current, voltage and time graph illustrating a method of controlling the current of a high-speed SRM according to another embodiment of the present invention. FIGS. 7A and 7B are current response characteristic graphs which are obtained when current control is performed according to the present invention.

Figure 1B:
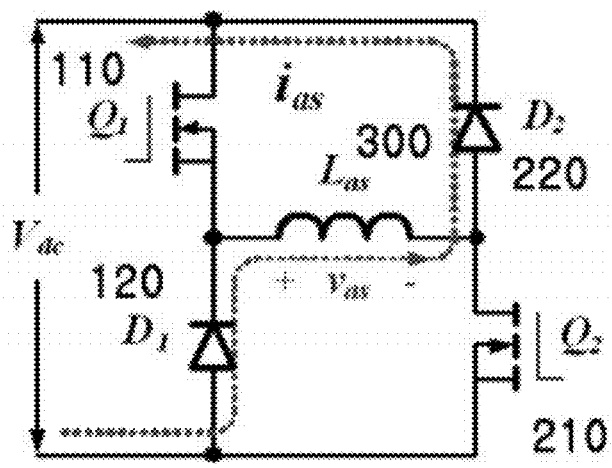

The method of controlling the current of high-speed SRM according to an embodiment of the present invention may be implemented using circuit diagrams shown in FIGS. 1A to 1B. FIG. 1 shows the configuration of an inverter unit used to control the current of a high-speed SRM, which includes first and second switching elements $Q_1$ and $Q_2$, first and second diodes $D_1$ and $D_2$, and a reactor $L_{as}$. Here, input is DC voltage $V_{dc}$, and output is reactor voltage $v_{as}$ and current $i_{as}$.

In greater detail, one end of the first switching element $Q_1$ 110 and one end of the second diode $D_2$ 220 are connected to $V_{dc}$ (+), and one end of the first diode $D_1$ 120 and one end of the second switching element $Q_2$ 210 are connected to $V_{dc}$ (−). Furthermore, the other end of the first switching element $Q_1$ 110 is connected to the other end of the first diode $D_1$ 120, and the other end of the second diode $D_2$ 220 is connected to the other end of the second switching element $Q_2$ 210. Furthermore, the reactor $L_{as}$ 300 is connected between the junction of the first switching element $Q_1$ 110 and the first diode $D_1$ 120 and the junction of the second diode $D_2$ 220 and the second switching element $Q_2$ 210.

That is, a circuit may be configured in such a way that a set of the first switching element $Q_1$ 110 and the first diode $D_1$ 120 connected in series to each other and a set of the second diode $D_2$ 220 and the second switching element $Q_2$ 210 are connected in parallel to a bridge circuit, and one end of the reactor $L_{as}$ 300 is connected to the junction of the first switching element $Q_1$ 110 and the first diode $D_1$ 120 and the other end of the reactor $L_{as}$ 300 is connected to the junction of the second diode $D_2$ 220 and the second switching element $Q_2$ 210.

Figure 1C:
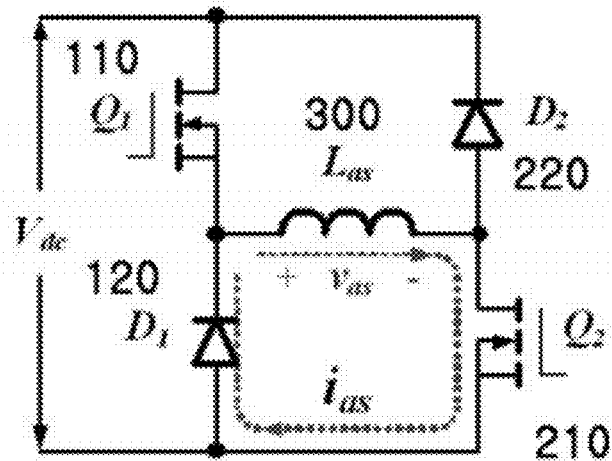
Figure 1D:
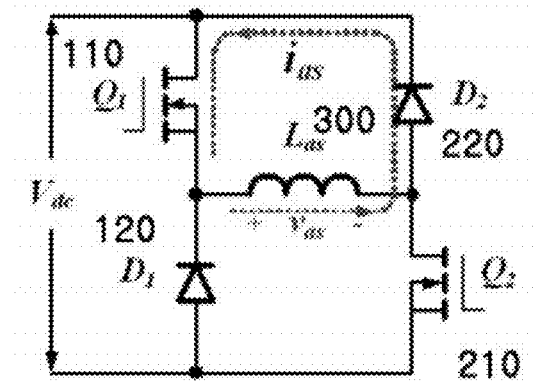

FIG. 1A shows excitation mode, in which the first switching element $Q_1$ 110 and the second switching element $Q_2$ 210 are all turned on. FIG. 1B shows demagnetization mode, in which the first switching element $Q_1$ 110 and the second switching element $Q_2$ 210 are all turned off. FIG. 1C shows free-wheeling mode-1, in which the first switching element $Q_1$ 110 is turned off and the second switching element $Q_2$ 210 is turned on. FIG. 1D shows free-wheeling mode-2, in which the first switching element $Q_1$ 110 is turned on the second switching element $Q_2$ 210 is turned off.

In the excitation mode, a closed circuit in which input voltage $V_{dc}$ is applied to the first switching element $Q_1$ 110, the reactor $L_{as}$ 300, and the second switching element $Q_2$ 210 is established. In the demagnetization mode, a closed circuit in which counter electromotive voltage $-V_{dc}$ is applied to the first diode $D_1$ 120, the reactor $L_{as}$ 300, and the second diode $D_2$ 220 is established. In the free-wheeling mode-1, the first diode $D_1$ 120, the reactor $L_{as}$ 300, and the second switching element $Q_2$ 210 form a closed circuit. Furthermore, in the free-wheeling mode-2, the first switching element $Q_1$ 110, the reactor $L_{as}$ 300, and the second diode $D_2$ 220 form a closed circuit.

The method of controlling the current of a high-speed SRM according to the present invention uses excitation mode, free-wheeling mode-1, free-wheeling mode-2, and demagnetization mode. In this method, current is controlled in a unit period T in which excitation mode, free-wheeling mode-1, excitation mode and free-wheeling mode-2 are sequentially performed, and, when the control is terminated, demagnetization mode is performed. In this specification, the method of controlling the current of a high-speed SRM is referred to as balanced soft chopping.

That is, balanced soft chopping, which is the method of controlling the current of a high-speed SRM according to the present invention, increases current switching frequency twice as high as the fixed switching frequency of each power element by alternately performing free-wheeling mode-1 and free-wheeling mode-2 after excitation mode, thereby being able to reduce current ripple.

Thereafter, FIG. 2 shows a graph of a PWM signal, a switching signal and an output signal according to the balanced soft chopping of the present invention. As described above, current is controlled over a total of two periods in each of which excitation mode, free-wheeling mode-1, excitation mode, and free-wheeling mode-2 are sequentially performed, and, when the control is terminated, demagnetization mode is performed, with the result that it can be seen that the switching frequency is increased twice by the PWM control. Furthermore, it can be seen that output voltage $v_{as}$ and output current $i_{as}$ are generated as the results of the PWM control. According to the present invention, even at a high switching frequency, switching stress can be uniformly distributed among the respective power elements.

FIG. 3 is a diagram of a logic circuit which implements the balanced soft chopping, which is the method of controlling the current of a high-speed SRM according to the present invention. As shown in FIG. 3, it will be apparent that first PWM control using the first switching element $Q_1$ and the second switching element $Q_2$ and second PWM control using the third switching element $Q_3$ and the fourth switching element $Q_4$ may be performed in a parallel fashion.

Thereafter, a method of controlling the current of a high-speed SRM according to another embodiment of the present invention will now be described. The method of controlling the current of a high-speed SRM according to the present embodiment is intended to further improve current control characteristics by compensating for current time delay in excitation mode, and sequentially controls the current of the high-speed SRM in maximum voltage mode, counter electromotive voltage mode, and PI control mode.

Referring to FIG. 4, the signal characteristics of a common encoder will now be described. From the encoder signal, a gate signal has time delay $t_d$ due to the dynamic property of a gate circuit and encoder signal latency which is approximately uniform in given hardware. Furthermore, a rising interval time delay $t_r$ is dependent on reference current $I^*_m$, phase voltage, and impedance such as inductance and resistance, and a falling interval time delay $t_f$ is independent on inductance, reference current, and DC voltage. At this location, the inductance of the motor occupies the minimum interval. If stator winding resistance is ignored, the rising and falling time delay may be expressed, as follows:

$$t_r = \frac{L_{min} I^*_m}{V_{as}} \quad (1)$$

$$t_f = \frac{L_{as}(\theta_{off}, i_{as}) I^*_m}{V_{dc}} \quad (2)$$

$$t_{dr} = t_d + t_r \quad (3)$$

$$t_{df} = t_d + t_f \quad (4)$$

As described above, in the high-speed operation mode of the SRM, time delay may become a more serious problem.

Despite taking into account the time delay, excitation current may bring about high overshoot due to fast excitation time in a high-speed interval.

The present invention is configured to sequentially control the current of the high-speed SRM in maximum voltage mode m1, in counter electromotive voltage mode m2, and in PI control mode m3. The present invention may select mode from among maximum voltage mode, counter electromotive voltage mode, and PI control mode using a mode selector, and output reference voltage, as shown in FIG. 5.

Here, the maximum voltage mode m1 is configured to apply maximum voltage $V_{max}$, the counter electromotive voltage mode m2 is intended to apply counter electromotive voltage $V_{emf}$ which is calculated using reactance, current, and motor speed, and PI control mode m3 is configured to apply PI control voltage value $V_{PI}$ which is obtained by performing PI control on the difference between reference current and actual current.

The maximum voltage $V_{max}$, the counter electromotive voltage $V_{emf}$, and the PI control voltage value $V_{PI}$ may be calculated using the following Equations:

$$V_{max} = V_{dc} \tag{5}$$

$$V_{emf} = i_m \frac{dL(\theta, i)}{d\theta} \omega_{rm} \tag{6}$$

$$V_{PI} = K_p \Delta i_m + K_i \int \Delta i_m dt + V_{emf} \tag{7}$$

where $i_m$ is the phase current of the motor, $I^*_m$ is the reference current, $\omega_{rm}$ is the speed of the motor, $\Delta i_m = I^*_m - i_m$, $K_p$ is proportional control constant, and $K_i$ is integral control constant.

Referring to FIG. 6, during the interval from point ⓐ where the switch is turned on to point ⓒ, that is, during the time $t_{m1}$, maximum voltage $V_{max}$ is applied as that in maximum voltage mode m1. $t_{m1}$ is the sum of the above-described hardware time delay $t_d$ and the rising interval time delay $t_r$. On the assumption that $t_d$=0, $t_{m1}$ can be calculated using Equation 1.

That is, point ⓒ is a point at which actual current reaches reference current. As shown in FIG. 6, feedback current does not reach reference current due to time delay. In the present invention, the interval between point ⓐ and point ⓒ is denoted by maximum voltage mode m1.

Once the maximum voltage mode during $t_{m1}$ has been terminated, counter electromotive voltage mode m2 is initiated. The counter electromotive voltage mode m2 is performed by applying counter electromotive voltage $V_{emf}$ during the interval from point ⓒ to point ⓓ where actual current and feedback current become equal.

As shown in Equation 6, in the calculation of the counter electromotive voltage $V_{emf}$, an inductance slope based on the location of a rotator and current assumes an approximately flat shape due to the unsaturated linear characteristics in a nonaligned position. This is obtained by simply multiplying a flat inductance slope and the motor speed by phase current, and does not require a complicated look-up table.

Once the counter electromotive voltage mode m2 has been terminated, PI control mode m3 is initiated. The PI control mode m3 is performed by applying PI control voltage $V_{PI}$ during the interval from point ⓓ where the counter electromotive voltage mode m2 is terminated to point ⓔ where the switch is turned off.

Figure 8:
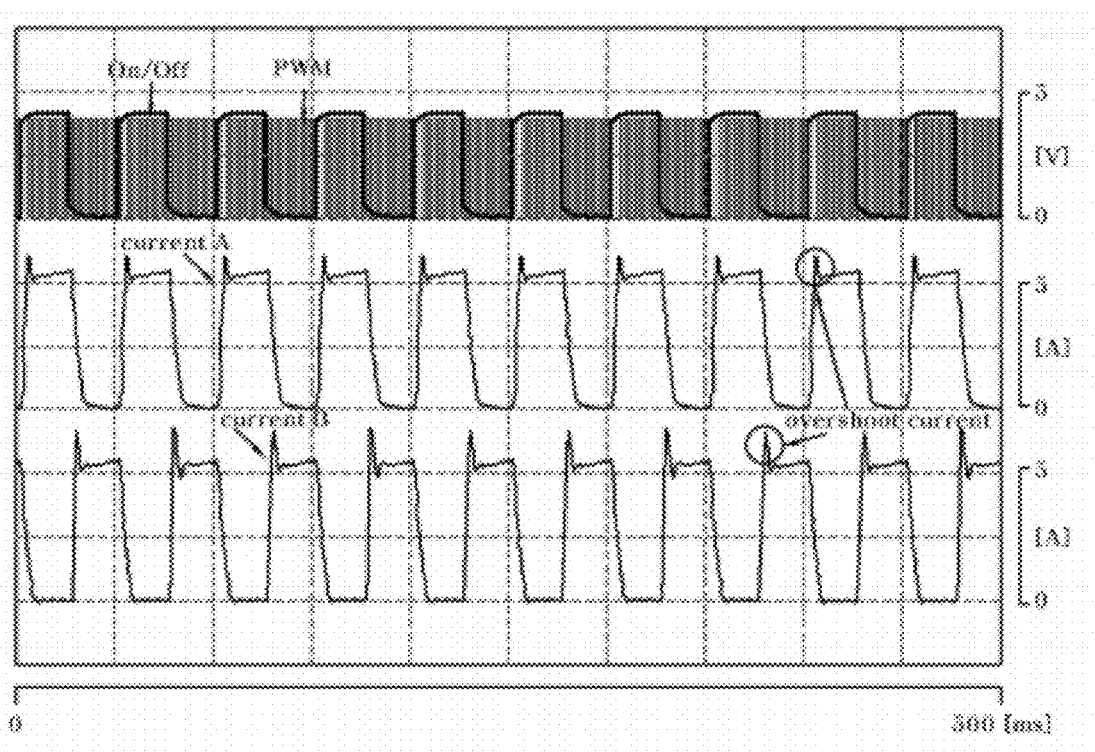
FIG. 8 is a current response characteristic graph which is obtained when current control is performed according to conventional technology.

FIGS. 7A and 7B show current response characteristic graphs that are obtained when current control is performed according to the above-described present invention. FIG. 7A is a current response graph at 10,000 rpm, and FIG. 7B is a current response graph at 30,000 rpm. As can be seen from FIG. 7A and FIG. 7B, an overshoot phenomenon caused by time delay can be overcome using the present invention. This can be more clearly exhibited when it is compared with an overshoot phenomenon that occurs when a conventional current controller is employed, as shown in FIG. 8.

Since the present invention is configured as described above, the method of controlling the current of a high-speed SRM according to the present invention is capable of reducing the current ripple of the high-speed SRM and overcoming overshoot current caused by the time delay of current sensing, thus enabling accurate and efficient current control to be performed in the high-speed SRM.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling current of a high-speed Switched Reluctance Motor (SRM) using an inverter circuit including a first switching element, a second switching element, a first diode, a second diode and a reactor, wherein:
    the first switching element and the first diode, the second diode and the second switching element are connected to a bridge circuit, and one end of the reactor is connected to a junction of the first switching element and the first diode, and a remaining end of the reactor is connected to a junction of the second diode and the second switching element; and excitation mode in which the first switching element is turned on the second switching element is turned on, free-wheeling mode-1 in which the first switching element is turned off and the second switching element is turned on, the excitation mode, and free-wheeling mode-2 in which the first switching element is turned on and the second switching element is turned off are sequentially performed in a unit period T, and, when the control is terminated, demagnetization in which the first switching element and the second switching element are turned off is performed,
    wherein in the excitation mode, the current of the high-speed SRM is sequentially controlled in maximum voltage mode and in counter electromotive voltage mode, and in PI control mode, and wherein in the maximum voltage mode, maximum voltage is applied in an interval from a point at which the switch is turned on to a point of rising interval time delay $t_r$, and in the counter electromotive voltage mode, counter electromotive voltage is applied in an interval from a point at which the maximum voltage mode is terminated to a point at which a phase current value and a feedback current value become equal.

2. The method as set forth in claim 1, wherein in the excitation mode, the current of the high-speed SRM is controlled in PI control mode after the counter electromotive voltage mode.

3. The method as set forth in claim 2, wherein in the maximum voltage mode, maximum voltage is $V_{max}$, in the counter electromotive voltage mode, counter electromotive voltage is $V_{emf}$, and in the PI control mode, PI control voltage $V_{PI}$ is applied in an interval from a point at which the counter electromotive voltage mode is terminated and a point at which the switch is turned off, where $$V_{max} = V_{dc},$$

$$V_{emf} = i_m \frac{dL(\theta, i)}{d\theta} \omega_{rm} \text{ and } V_{PI} = K_p \Delta i_m + K_i \int \Delta i_m dt + V_{emf}.$$

* * * * *